(12) United States Patent
Mori et al.

(10) Patent No.: US 6,425,746 B1
(45) Date of Patent: Jul. 30, 2002

(54) COMPRESSOR AND REGENERATOR FOR FUEL CELL

(75) Inventors: Hidefumi Mori; Ryuta Kawaguchi, both of Kariya (JP)

(73) Assignee: Kabushiki Kaisha Toyoda Jidoshokki Seisakusho, Kariya (JP)

( * ) Notice: Subject to any disclaimer, the term of this patent is extended or adjusted under 35 U.S.C. 154(b) by 0 days.

(21) Appl. No.: 09/658,369

(22) Filed: Sep. 8, 2000

(30) Foreign Application Priority Data

Sep. 28, 1999 (JP) .......................................... 11-274145

(51) Int. Cl.$^7$ ................................................ F01C 1/02
(52) U.S. Cl. ..................................... 418/55.2; 418/55.4
(58) Field of Search ................................ 417/381, 406; 418/55.2, 55.3, 55.4, 142, 144, 60; 429/34

(56) References Cited

U.S. PATENT DOCUMENTS

| | | | | |
|---|---|---|---|---|
| 2,841,089 A | * | 7/1958 | Jones | 418/55.2 |
| 3,986,799 A | * | 10/1976 | McCullough | 418/55.2 |
| 4,677,949 A | * | 7/1987 | Youtie | 418/60 |
| 5,094,205 A | * | 3/1992 | Billheimer | 418/60 |
| 5,269,729 A | * | 12/1993 | Thueman et al. | 474/207 |
| 5,624,247 A | * | 4/1997 | Nakamura | 418/55.2 |
| 6,266,952 B1 | * | 7/2001 | Choroszylow et al. | 417/5 |
| 6,338,912 B1 | * | 1/2002 | Ban et al. | 429/34 |

FOREIGN PATENT DOCUMENTS

| | | |
|---|---|---|
| JP | 7-14599 | 1/1995 |
| JP | 8-61264 | 3/1996 |
| JP | 9-250463 | 9/1997 |
| JP | 9-250474 | 9/1997 |
| JP | 9-310689 | 12/1997 |

* cited by examiner

*Primary Examiner*—Michael Koczo
(74) *Attorney, Agent, or Firm*—Woodcock Washburn LLP

(57) ABSTRACT

A compressor and regenerator for a fuel cell according to the present invention comprises a compression mechanism portion C having a compression chamber 14 for pressurizing an oxygen-containing gas to a high pressure to supply air to a fuel cell F, and a regenerative mechanism portion E having a regenerative chamber 24 so constituted as to be operated with the compression mechanism portion C by the same motor M and assisting the motor M using an exhaust gas G exhausted from the fuel cell F. The compression chamber 14 of the compression mechanism portion C and the regenerative chamber 24 of the regenerative mechanism portion E are adjacent to each other. A seal ring grove 80 is defined in a ring-like zone 54b of a center housing 20, and a seal ring 81 is fitted in the seal ring groove 80.

3 Claims, 4 Drawing Sheets

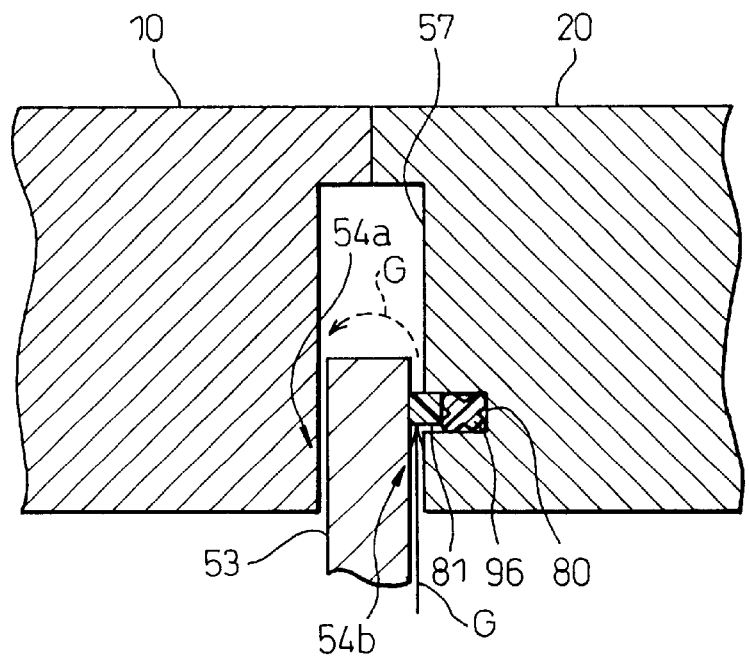
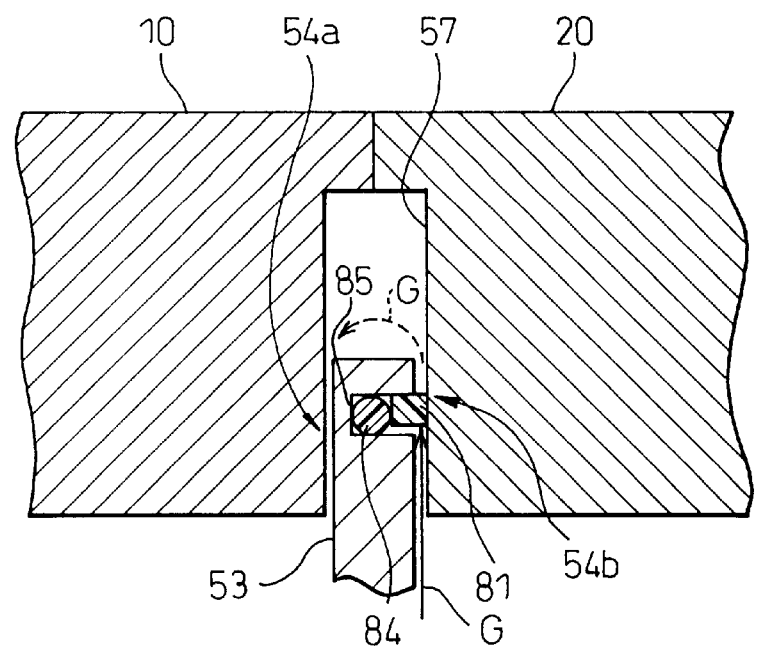

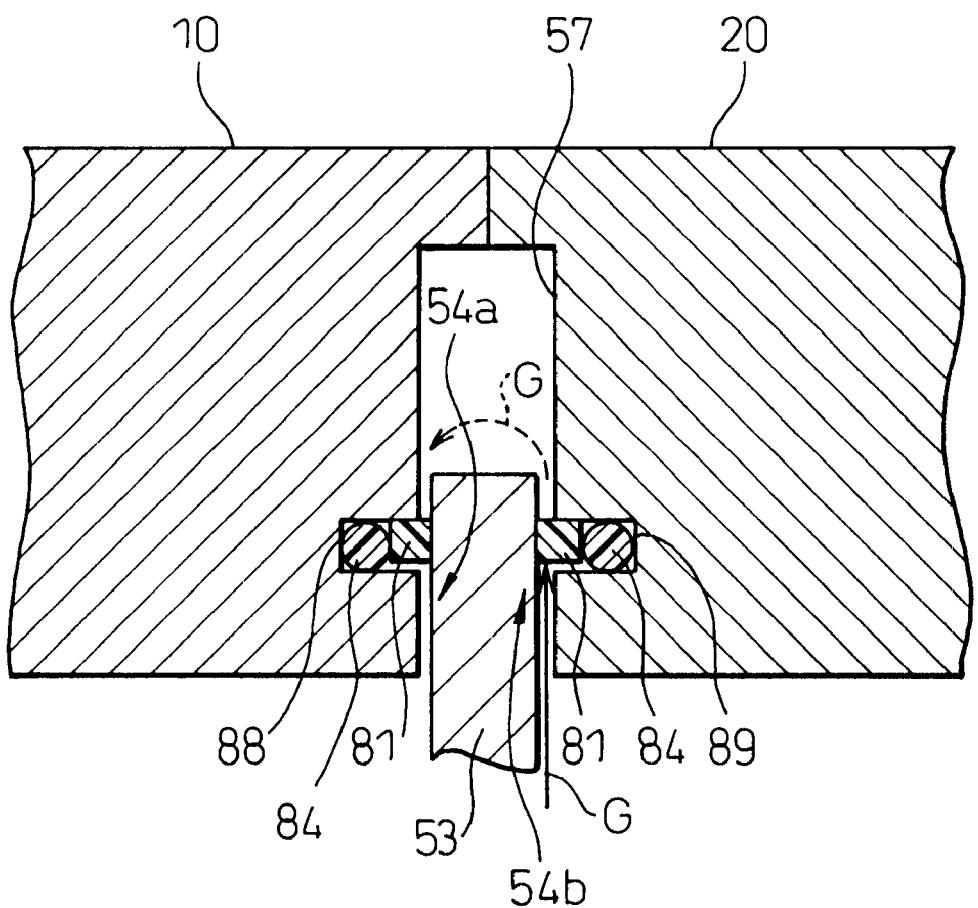

COMPRESSOR AND REGENERATOR FOR FUEL CELL

BACKGROUND OF THE INVENTION

1. Field of the Invention

This invention relates to a fuel cell system having a compressor and a regenerator.

2. Description of the Related Art

A compressor and regenerator for a fuel cell is connected to a fuel cell in a fuel cell device used for a car as, for example, described in Japanese Unexamined Patent Publication (Kokai) No. 7-14599. In fuel cells in general, a pair of separators is disposed one on each side of an electrolyte layer. Feed grooves for supplying fuel and an oxygen-containing gas are formed in these separators. One of the separators supplies a hydrogen-containing fuel and the other separator supplies an oxygen-containing gas such as air. In consequence, electrons move, due to the chemical reaction between hydrogen and oxygen, to provide a current. A fuel feed pipe and an air feed pipe are connected to the upstream side of such a fuel cell to supply the fuel and air, respectively. The air feed pipe is open to the atmosphere through a compression mechanism portion that is driven by a motor. The compression mechanism portion pressurizes air from the atmosphere to a predetermined pressure and supplies the air to the fuel cell. An air exhaust pipe is connected to the downstream side of the fuel cell to exhaust an exhaust gas, after oxygen is extracted from air inside the fuel cell, to the atmosphere. A regenerative mechanism portion is connected to the air exhaust pipe so as to assist the motor operating the compression mechanism portion, using power that is generated as the exhaust gas is expanded. In the fuel cell device of this kind, each of the compression mechanism portion and the regenerative mechanism portion use a separate compressor and regenerator for a fuel cell. In this fuel cell device, the compression mechanism portion and the regenerative mechanism portion are constituted so that they can be operated by the same driving source.

However, the conventional compressor and regenerator for a fuel cell involves the problem that it takes large installation area and its mountability in a car, for example, is bad, because the compression mechanism portion and the regenerative mechanism portion are separate from each other. This problem may be solved if the compression mechanism portion and the regenerative mechanism portion are integrated with each other.

Even if the compression mechanism portion and the regenerative mechanism portion are thus integrated, another problem remains to be solved. If a compression chamber and a regenerative chamber are. greatly spaced apart from each other, the route of a pipe for connecting the compression chamber and the regenerative chamber through the fuel cell is long, and a pressure loss in the oxygen-containing gas is likely to occur in the interim. Therefore, the oxygen-containing gas does not have sufficient pressure when supplied to the fuel cell, with the result that power generation performance of the fuel cell drops, or the regenerative mechanism portion cannot sufficiently assist the driving source because an exhaust gas having sufficient pressure is not supplied thereto.

To cope with this problem, the compression chamber for increasing the pressure of the oxygen-containing gas to a high pressure in the compression mechanism portion and the regenerative chamber for assisting the driving source by the exhaust gas in the regenerative mechanism portion may be disposed adjacent to each other. In this case, however, the exhaust gas is likely to form a by-path leaked from the regenerative chamber side to the compression chamber side. In other words, oxygen of the exhaust gas is to be extracted in the fuel cell. Therefore, if exhaust gas having a low density of oxygen leaks to the compression chamber, the pressure of this exhaust gas having a low density of oxygen is elevated to a high pressure in the compression mechanism portion and is then supplied to the fuel cell. In this case, a sufficient amount of oxygen for generating a current in the fuel cell cannot be supplied, and power generation performance of the fuel cell consequently drops.

SUMMARY OF THE INVENTION

In view of the problems described above, it is an object of the present invention to provide a compressor and regenerator for a fuel cell that can sufficiently assist a driving source and can ensure a high power generation performance of a fuel cell.

A compressor and regenerator for a fuel cell according to the present invention includes a compression mechanism portion having a compression chamber for pressurizing an oxygen-containing gas to a high pressure to supply this oxygen-containing gas to a fuel cell; and a regenerative mechanism portion having a regenerative chamber for assisting a driving source by an exhaust gas exhausted from the fuel cell; wherein the compression mechanism portion and the regenerative mechanism portion are constituted in such a manner as to be operated by the same driving source; wherein the compression chamber and the regenerative chamber are disposed adjacent to each other; and wherein sealing means, for preventing a leaked by-path of the exhaust gas from the regenerative chamber to the compression chamber, is interposed between the compression chamber and the regenerative chamber.

In the compressor and regenerator for a fuel cell according to the present invention, the compression mechanism portion and the regenerative mechanism portion are so constituted as to be operated by the same driving source and are integrated with each other. Therefore, the installation area is small, and excellent mountability to a car, for example, can be achieved.

In the compressor and regenerator for a fuel cell according to the present invention, the compression chamber and the regenerative chamber are disposed adjacent to each other. Therefore, the route for pipes for connecting the compression chamber to the regenerative chamber through the fuel cell becomes short, and the pressure loss in the oxygen-containing gas does not occur so easily in this route. Therefore, the oxygen-containing gas retains a pressure sufficient for it to be supplied to the fuel cell, and a good power generation performance of the fuel cell can be maintained. An exhaust gas having a sufficient pressure is supplied to the regenerative mechanism portion, and the power of the driving source can be sufficiently assisted.

In the compressor and regenerator for a fuel cell according to the present invention, sealing means for preventing a leaked by-path of the exhaust gas to the compression chamber is interposed between the compression chamber and the regenerative chamber. Therefore, the sealing means prevents the exhaust gas, that has a low density of oxygen, from forming a by-path leaked to the compression chamber and can thus prevent the exhaust gas having a low density of oxygen from being pressurized by the compression mechanism portion and supplied to the fuel cell. In consequence, oxygen can be supplied in a sufficient amount for generating the current in the fuel cell, and power generation performance of the fuel cell can be maintained.

For these reasons, the compressor and regenerator for a fuel cell according to the present invention can sufficiently assist the driving source and can keep the power generation performance of the fuel cell high.

The compression mechanism portion constituted as a scroll type includes a housing, one surface of a side plate which orbit by the rotation of a drive shaft and a first spiral member protruding from this surface. The regenerative mechanism portion constituted as a scroll type includes the housing forming the compression mechanism portion, the other surface of the side plate opposite to the surface of the side plate forming the compression mechanism portion, and a second spiral member formed on this other surface to protrude therefrom. This construction can provide a quiet and light compressor and regenerator for a fuel cell. Because the compression mechanism portion and the regenerative mechanism portion can share the side plate from which the first and second spiral members protrude, the total length in the axial direction inclusive of the driving source can be reduced. Therefore, the compressor and regenerator has excellent mountability to a car, for example. In this compressor and regenerator for a fuel cell, the sealing means is formed between the housing, that constitutes the compression mechanism portion and the regenerative mechanism portion, and the side plate that constitutes the compression mechanism portion and the regenerative mechanism portion.

Such a sealing means comprises a ring-like zone formed by the housing and the side plate, in which at least one of the surfaces of the side plate and the housing always oppose each other, a seal ring groove formed annularly in the ring-like zone, and a seal ring fitted in the seal ring groove and coming into sliding contact with the side plate or the housing. This structure can enable the exhaust gas in the ring-like zone to apply a suitable back pressure to the seal ring in the seal ring groove. Due to the movement of the side plate, the seal ring in the seal ring groove is urged towards the side plate or the housing on the basis of the Bernoulli's theorem. In this way, the exhaust gas in the regenerative chamber is sealed by the seal ring and is prevented from being by-passed to the compression chamber.

If the exhaust gas is sealed by only applying the back pressure, a little amount of the exhaust gas may be by-passed, depending upon a degree of the back pressure. Therefore, the seal ring is preferably urged towards the side plate or the housing by an urging means. If so, the seal ring is urged towards the side plate or the housing by the urging means despite the degree of the back pressure, and the exhaust gas securely prevents from by-passing.

An O-ring, that is commercially available and relatively economical, can be used for the urging means. This O-ring is preferably stored in the seal ring groove squeezed to some extent without creating clearance in the width direction of the seal ring groove. If any clearance is created in the width direction of the seal ring groove, the seal ring is deviated from the O-ring in the seal ring groove. In such a case, the O-ring is likely to fail to urge the seal ring towards the side plate or the housing.

O-rings have various shapes such as an ordinary solid circular section type, an X-shaped section type, an H-shaped section type, a C-shaped section type, a hollow type, and so forth. Among them, the O-ring having an ordinary solid circular section type is likely to invite a large change of reaction with respect to a squeeze and to eventually invite a great variance of quality of the compressor and regenerator for a fuel cell. Therefore, an O-ring having the X-shaped section, an O-ring having the H-shaped section, an O-ring having the C-shaped section or an O-ring having the hollow shape is preferably used. Particularly when the O-ring having an X-shaped section is employed, the exhaust gas can enter the clearance of this O-ring, and the seal ring can be urged more easily towards the side plate or the housing by the urging force of the O-ring and the pressure of the exhaust gas. As a result, the prevention effect of by-passing of the exhaust gas becomes greater.

The present invention may be more fully understood from the description of preferred embodiments of the invention set forth below, together with the accompanying drawings.

BRIEF DESCRIPTION OF THE DRAWINGS

FIG. 4 is an enlarged sectional view showing the principal portions of a compressor and regenerator for a fuel cell according to the third embodiment of the present invention;

FIG. 5 is an enlarged sectional view showing the principal portions of a compressor and regenerator for a fuel cell according to the fourth embodiment of the present invention; and FIG. 6 is an enlarged sectional view showing the principal portions of a compressor and regenerator for a fuel cell according to the fifth embodiment of the present invention.

DESCRIPTION OF THE PREFERRED EMBODIMENTS

Hereinafter, the first to fourth embodiments of the present invention that embody the compressor and regenerator for a fuel cell according to the present invention will be explained with reference to the accompanying drawings.

(Embodiment 1)

Figure 1:
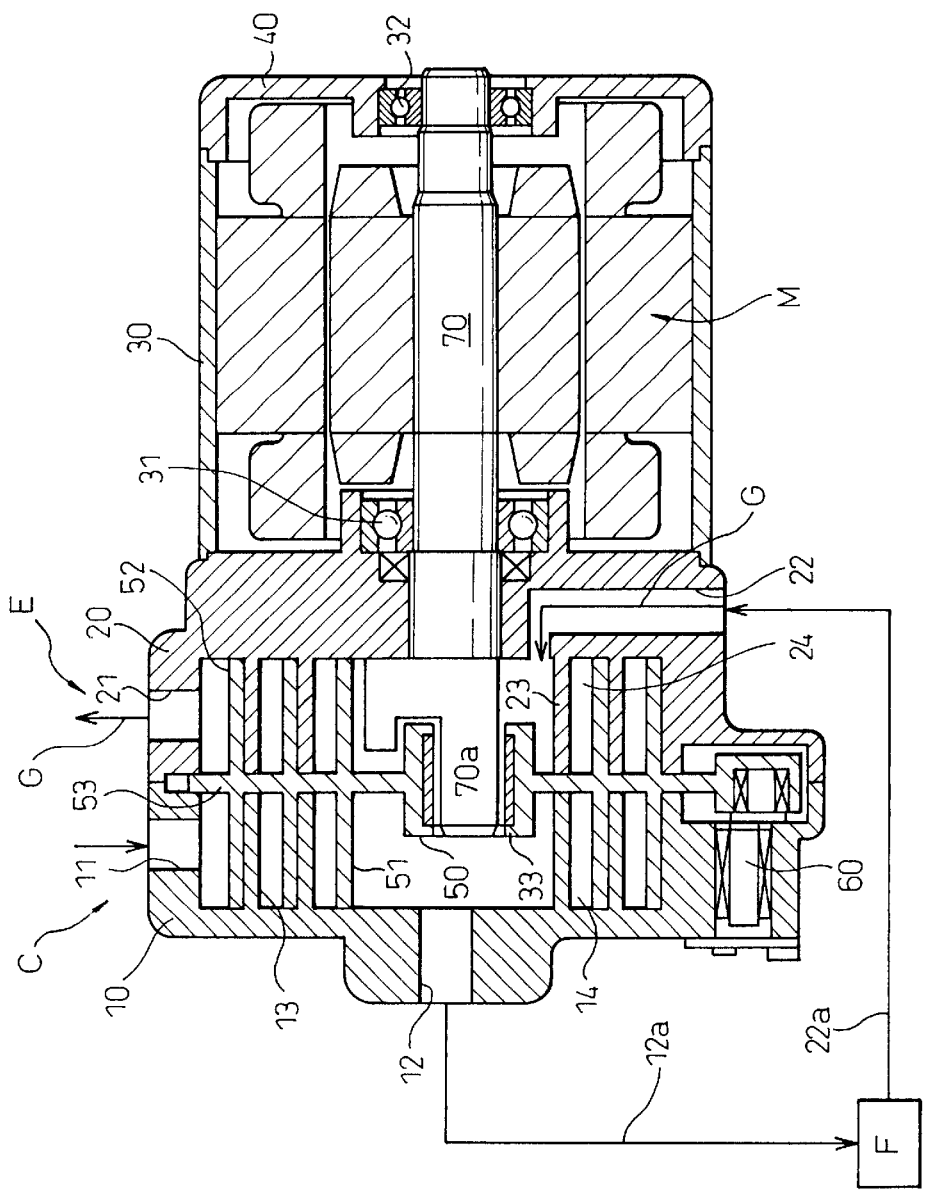
FIG. 1 is an overall longitudinal sectional view of a compressor and regenerator for a fuel cell according to an embodiment of the present invention.

In the compressor and regenerator for a fuel cell according to the first embodiment, a center housing 20 is coupled with a front housing 10, and a cylindrical case 30 is coupled with the rear end of the center housing 20 as shown in FIG. 1. A rear housing 40 is coupled with the rear end of the case 30.

An air suction port 11, that is communicated with the atmosphere, is open on the side surface of the front housing 10 in a radial direction, and an air discharge port 12 is open at the front end of the center portion of the front housing 10 in an axial direction. An air feed pipe 12a, that is connected to the fuel cell F on an oxygen-gas feed side, is connected to the air discharge port 12. A first stationary spiral member 13 is so formed in the front housing 10 and protrudes rearward in the axial direction.

Another air exhaust port 21, that is open to the atmosphere, is so formed as to open on the side surface of the center housing 20 in the radial direction, and an air introduction port 22 is also open. An air exhaust pipe 22a, that is connected to the exhaust side of the oxygen-containing gas of the fuel cell F, is connected to the air introduction port 22. A second stationary spiral member 23 is formed to protrude forward in the axial direction in the center housing 20.

A disc-like side plate 53 is located between the front housing 10 and the center housing 20 each having the structure described above. A first movable spiral member 51 is formed on this side plate 53 and protrudes forward in the axial direction, and a second movable spiral member 52 is formed to protrude rearward in the axial direction. The first movable spiral member 51 of the side plate 53 meshes with the first stationary spiral member 13 of the front housing 10, and the second movable spiral member 52 of the side plate 53 meshes with the second stationary spiral member 23 of the center housing 20.

A rotation prevention mechanism 60 is interposed between the front housing 10, the center housing 20 and the slide plate 53. A boss 50 is formed at the center of the side plate 53 in such a fashion as to protrude both forward and rearward in the axial direction.

A drive shaft 70 is rotatably supported by the center housing 20 and the rear housing 40 through the bearing devices 31 and 32 in the case 30. A motor M inclusive of the drive shaft 70 is provided in the case 30. A crank pin 70a protrudes eccentrically to the axis from the front end of the drive shaft 70, and is rotatably fitted in the boss 50 of the side plate 53 through the bearing device 33.

In this way, a compression chamber 14, closed by the front housing 10 and the side plate 53, is defined, and these members together form a scroll type compression mechanism portion C. The air suction port 11 is communicated with the compression chamber 14 before the compression chamber is closed. The air discharge port 12 is communicated with the compression chamber 14 that finally finishes the compression operation. A regenerative chamber 2.4, closed by the center housing 20 and the side plate 53, is defined, and these members together form a scroll type regenerative mechanism portion E. The air exhaust port 21 is communicated with the regenerative chamber 24 that finally finishes the expansion operation and is not closed. The air introduction port 22 is communicated with the regenerative chamber 24 that is closed and has the smallest capacity.

Figure 2:
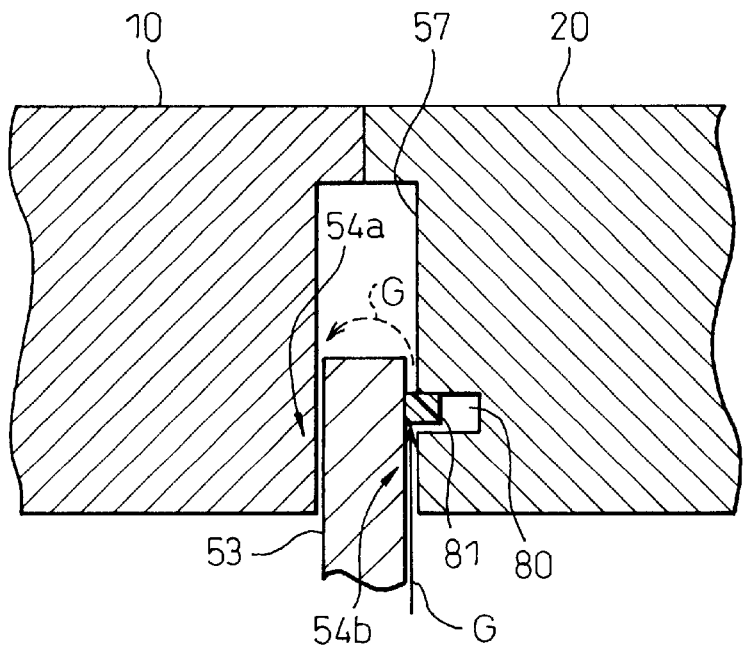
FIG. 2 is an enlarged sectional view showing the principal portion of a compressor and regenerator for a fuel cell according to the first embodiment of the present invention.

To prevent a leaked by-path of the exhaust gas G from the regenerative chamber 24 to the compression chamber 14, a sealing means is used. In other words, a recess 57 is defined between the front housing 10 and the center housing 20 as shown in FIG. 2 so that the side plate 53 can slide in the recess 57. A ring-like zone 54a, in which the front housing 10 and one of the surfaces of the side plate 53 always oppose each other at the outer periphery of the side plate 53, and a ring-like zone 54b, in which the center housing 20 and the other surface of the side plate 53 always oppose each other at the outer periphery of the side plate 53, are defined in the recess 57. A seal ring groove 80 is formed in the ring-like zone 54b of the center housing 20 in such a manner as to open to the side plate (53) side. A seal ring 81 made of PTFE is fitted in this seal ring groove 80.

When the drive shaft 70 is driven by the motor M in the compressor and regenerator for a fuel cell having the structure described above as shown in FIG. 1, the side plate 53 only orbits while its rotation is orbit restricted by the rotation prevention mechanism 60. Consequently, as the capacity of the compression chamber 14 of the compression mechanism portion C gradually decreases, air in the atmosphere is sucked from the air suction port 11 into the compression chamber 14. After being compressed to a high pressure in the compression chamber 14, air is supplied from the air discharge port 12 into the fuel cell F through the air feed pipe 12a. Oxygen from the air is consumed inside the fuel cell F, and air remaining as the exhaust gas G is supplied from the air exhaust pipe 22a into the regenerative chamber 24 of the regenerative mechanism portion E through the air introduction port 22.

The exhaust gas G supplied into the regenerative chamber 24 is expanded simultaneously with the operation described above. Therefore, the volume of the regenerative chamber 24 gradually increases. Most of the exhaust gas G in the regenerative chamber 24 is expanded to the atmospheric pressure and is exhausted from the air exhaust port 21 into the atmosphere. In the interim, power is generated to drive the drive shaft 70, and this power assists the power of the motor M that operates the compression mechanism portion C.

In this instance, the route through the air feed pipe 12a and the air exhaust pipe 22a, which connect the compression chamber 14, fuel cell F, and the regenerative chamber 24 is short, because the compression chamber 14 and the regenerative chamber 24 are adjacent to each other. A pressure loss in the air does not occur easily in this route. Consequently, air has sufficient pressure to be supplied to the fuel cell F, and the generation performance of the fuel cell F can be kept high. The exhaust gas G having a sufficient pressure is supplied to the regenerative mechanism E, and power of the motor M can be sufficiently assisted.

However, a part of the exhaust gas G supplied into the regenerative chamber 24 attempts to move from the side of the regenerative chamber 24 to the side of the compression chamber 14 as shown in FIG. 2. In this compressor and regenerator for a fuel cell according to this embodiment, however, the seal ring 81 is fitted in the seal ring groove 80 between the compression chamber 14 and the regenerative chamber 24. The exhaust gas G in the ring-like zone 54b applies a suitable back pressure to the seal ring 81 in the seal ring groove 80. The seal ring 81 in the seal ring groove 80 is biased towards the side plate 53. At the same time, due to the movement of the side plate 53, the pressure of the seal ring 81 on the side of the side plate 53 becomes lower than the pressure on the opposite side of the side plate 53 on the basis of the Bernoulli's theorem. In consequence, the seal ring 81 is effectively attracted to the side plate 53. Because the seal ring 81 thus prevents a leaked bypath of the exhaust gas G, the exhaust gas G is prevented from being pressurized by the compression mechanism portion C to a high pressure and from being supplied to the fuel cell F. Only air containing sufficient oxygen can thus be sucked into the compression chamber 14 and supplied to the fuel cell F. Therefore, sufficient amount of oxygen can be supplied to the fuel cell F to generate current, and the power generation performance of the fuel cell F can be maintained.

In the compressor and regenerator for a fuel cell according to this embodiment, the compression mechanism portion C and the regenerative mechanism portion E are integrated with each other so that they can be driven by the same motor M. Therefore, it takes small installation area and the mountability to the car is excellent. Particularly because the compression mechanism portion C and the regenerative mechanism portion E share the side plate 53 in this compressor and regenerator for a fuel cell, the total length in the axial direction including the motor M can be reduced. In consequence, the excellent mountability to the car can be achieved, the construction is remarkably simplified, and the production cost can be reduced.

For these reasons, the compressor and regenerator for a fuel cell makes it possible to sufficiently assist the motor M and to keep the power generation performance of the fuel cell F high.

Incidentally, since the compression mechanism portion C and the regenerative mechanism portion E are of the scroll type, this compressor and regenerator for a fuel.cell is quiet and light.

(Embodiment 2)

Figure 3:
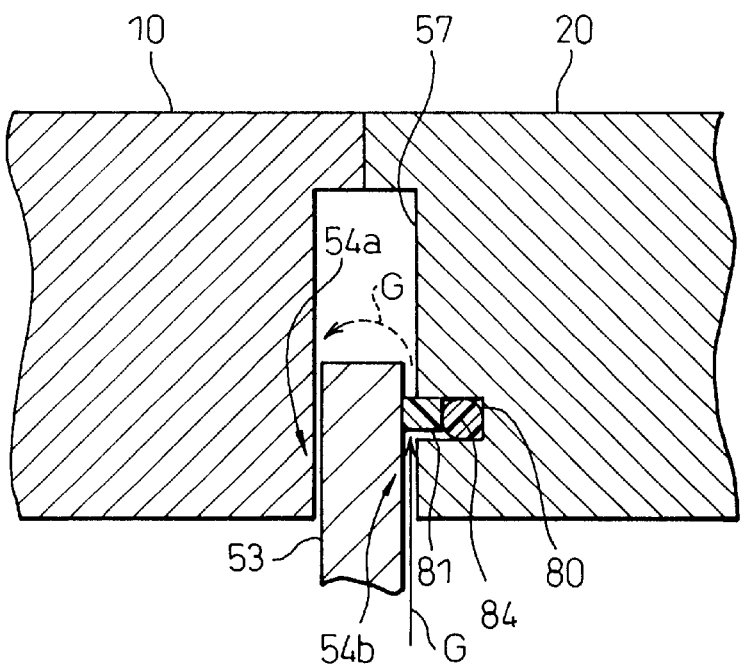
FIG. 3 is an enlarged sectional view showing the principal portions of a compressor and regenerator for a fuel cell according to the second embodiment of the present invention.

The compressor and regenerator for a fuel cell according to the second embodiment employs sealing means shown in FIG. 3. A seal ring 81 is fitted in the seal ring groove 80 through an O-ring 84 as urging means. This O-ring 84 has an ordinary solid circular section. The O-ring 84 pushes the seal ring 81 to the side plate 53. The rest of the construction is the same as that of the first embodiment.

In this compressor and regenerator for a fuel cell, the O-ring 84 pushes the seal ring 81 towards the side plate 53 irrespective of the degree of the back pressure of the exhaust gas G, and reliably prevents the leaked by-path of the exhaust gas G. Therefore, this compressor and regenerator for a fuel cell can further enhance the effects of the present invention.

(Embodiment 3)

The compressor and regenerator for a fuel cell according to the third embodiment employs sealing means shown in FIG. 4. The seal ring 81 is fitted in the seal ring groove 80 with an O-ring 96 that has an X-shaped section. The rest of the construction is the same as that of the first embodiment.

In this compressor and regenerator for a fuel cell, the O-ring 96 can decrease the change of reaction with respect to a squeeze margin and eventually, can reduce a variation in quality. Since the exhaust gas enters the clearance of this O-ring 96, the pushing force of the O-ring 96 and the pressure of the exhaust gas G push the seal ring 81 more strongly towards the side plate 53 and provide a great effect of preventing the leaked by-path of the exhaust gas G. Therefore, this compressor and regenerator for a fuel cell can further enhance the effects of the present invention.

(Embodiment 4)

The compressor and regenerator for a fuel cell according to the fourth embodiment employs sealing means shown in FIG. 5. A seal ring grove 85 that opens to the center housing 20 is formed in the ring-like zone of the side plate 53, and the seal ring 81 is fitted in the seal ring groove 85 through the O-ring 84. The rest of the construction is the same as that of the second embodiment.

This embodiment can exhibit the same function and effect as that of the second embodiment.

(Embodiment 5)

The compressor and regenerator machine for a fuel cell according to the fifth embodiment employs sealing means shown in FIG. 6. A seal ring groove 88 that opens to the side plate 53 is formed in the ring-like zone 54a of the front housing 10. A seal ring groove 89 that opens to the side plate 53 is formed in the ring-like zone 54b of the center housing 20. The seal rings 81 are fitted in the seal ring grooves 88 and 89 with the O-ring 84. The rest of the construction is the same as that of the second embodiment.

This compressor and regenerator for a fuel cell can exhibit the same function and effect as that of the second embodiment.

While the invention has been described by reference to specific embodiments chosen for purposes of illustration, it should be apparent that numerous modifications could be made thereto by those skilled in the art without departing from the basic concept and scope of the invention.

What is claimed is:

1. A fuel cell system comprising a compressor and a regenerator connected to a fuel cell, including:

a compression mechanism portion connected to said fuel cell and having a compression chamber wherein an oxygen-containing gas is pressurized to a high pressure to supply said oxygen-containing gas to said fuel cell; and a regenerative mechanism portion connected to said fuel cell and having a regenerative chamber that uses an exhaust gas exhausted from said fuel cell to assist a driving source;

wherein said compression mechanism portion and said regenerative mechanism portion are arranged in such a manner as to be operated by said driving source;

wherein said compression mechanism portion is of a scroll type comprising:
a housing;
one surface of a side plate orbiting by a drive shaft; and
a first spiral member so formed as to protrude from said one surface;

wherein said regenerative mechanism portion is of a scroll type comprising:
said housing;
an opposite surface of said side plate; and
a second spiral member so formed as to protrude from said opposite surface;

wherein said compression chamber and said regenerative chamber are disposed adjacent to each other;

a sealing means interposed between said compression chamber and said regenerative chamber for preventing a leaked by-path of said exhaust gas from said regenerative chamber to said compression chamber;

wherein said sealing means is formed between said housing and said side plate;

wherein said sealing means comprises a ring-like zone between said housing and said side plate, in which at least one of the surfaces of said side plate and said housing always oppose each other, a seal ring groove formed in a ring form in said ring-like zone, and a seal ring fitted in said seal ring groove and coming into sliding contact with one of said side plate and said housing; and wherein said seal ring is urged toward one of said side plate and said housing by an urging means.

2. The system according to claim 1, wherein said urging means is an O-ring.

3. The system according to claim 2, wherein said O-ring has an X-shaped section.

* * * * *